United States Patent [19]

Cho et al.

[11] 4,025,659

[45] May 24, 1977

[54] SOY PROTEIN/CASEIN COFFEE WHITENER COMPOSITION

[75] Inventors: Iue Chung Cho; Charles W. Kolar, Jr., both of St. Louis, Mo.

[73] Assignee: Ralston Purina Company, St. Louis, Mo.

[22] Filed: May 21, 1976

[21] Appl. No.: 685,882

Related U.S. Application Data

[63] Continuation-in-part of Ser. No. 584,682, June 6, 1975, abandoned.

[52] U.S. Cl. .............................. 426/613; 426/656; 426/657; 426/658
[51] Int. Cl.$^2$ ....................... A23D 5/00; A23L 1/19
[58] Field of Search .......... 426/250, 539, 570, 572, 426/580, 585, 613, 656, 657, 658

[56] References Cited

UNITED STATES PATENTS 2,933,393  4/1960  Ortman .............................. 426/588
3,642,492  2/1972  Arnot ............................ 426/250 X

OTHER PUBLICATIONS

"Atlas Emulsifiers for Coffee Whiteners," May 1965, Atlas Chem. Ind., Wilmington, Del., p. 1–12.

*Primary Examiner*—Raymond N. Jones
*Assistant Examiner*—R. A. Yoncoskie
*Attorney, Agent, or Firm*—Veo Peoples, Jr.

[57] ABSTRACT

Coffee whitener compositions containing soy protein isolate will exhibit substantial resistance to "feathering" or oil separation in hot coffee provided that the soy is used in combination with caseinate. The caseinate is present in an amount of at least 0.9% based on the dry weight of the coffee whitener composition. Furthermore, by carefully correlating the combined amount of the soy and caseinate in the coffee whitener compositon with the relative ratio of soy:caseinate, the characteristic "feathering" from soy protein isolate is eliminated.

10 Claims, No Drawings

SOY PROTEIN/CASEIN COFFEE WHITENER COMPOSITION

This is a continuation-in-part of Ser. No. 584,682, filed June 6, 1975, now abandoned.

BACKGROUND OF THE INVENTION

This invention relates generally to compositions of soy protein isolates and caseinate which exhibit desirable functional properties. Also, this invention relates to a method of combining caseinate with soy protein isolate so that the previously mentioned desirable functional properties are imparted to the soy and thereby permit its use in coffee whiteners where it was heretofore unsuitable. Prior to the present invention, the principal proteinaceous ingredient in coffee whiteners was neutralized casein which is generally referred to as caseinate. However casein is a milk-derived protein. Unfortunately milk, like other dairy products, is becoming increasingly more scarce and more expensive. Therefore a need has developed for replacing the more expensive milk-derived protein casein with a more plentiful and less expensive protein, such as soy protein. Although attempts have been made to work soy protein into dairy formulations in the past, these attempts required cumbersome and costly modification of the soy protein. For example, U.S. Pat. Nos. 3,642,493 and 3,642,492 call for physico-thermo-vapor flash pretreatment of the isolated soy protein and combining it with certain levels of whey solids; U.S. Pat. No. 3,764,711 calls for chemically modifying the soy isolate molecular structure by addition of an acyl bearing anhydride group. It is of note however, that the functionality of even these isolates can be improved by the instant invention. Prior to the present invention no attempt was made to merely combine commercially available soy protein isolates (which had not undergone these special treeatments e.g. U.S. Pat. No. 3,764,711 ) with caseinate because there was no known interaction between the two which corrects the deficiency of the soy protein isolate. The principle characteristic deficiency of soy protein isolate which makes it unsuitable for coffee whiteners is "feathering". "Feathering" is a term used in the art to describe the situation where the protein contacts substantial concentrations of coffee, tea and beverages of similar composition and as a consequence thereof precipitates, aggregates or becomes insoluble. Soy protein isolates will feather no matter what quantity is used if the soy is used alone. This may be due to caffeic, chlorogenic and/or tannic acids, therein, which are capable of forming salts or complexes with basic amino functional groups of the protein, i.e., epsilon amino groups, so as to cause precipitation. Therefore it would not seem possible that merely dry blending with caseinate, a soy protein isolate which exhibits this chemical deficiency would in any way affect the characteristics which cause feathering. Also, most water soluble proteins tend to coagulate when subjected to heat. Proteins other than soy protein isolates, such as even casein, sodium caseinate, etc., when used in coffee whitener formulations, also are subject to such feathering or other non-functionality under some conditions, such as when utilized in amounts less than a prescribed minimum or when subjected to certain harsh coffee environments such as with freeze-dried instant coffee.

Accordingly a simple yet uniquely effective means for adapting soy protein isolates to coffee whitener compositions and for substantially reducing the amount of caseinate would represent a substantial advancement of the art.

SUMMARY OF THE INVENTION

The present invention comprises providing a proteinaceous ingredient for use in coffee whitener formulations which is substantially resistant to feathering even though a substantial amount of soy protein isolate is present.

This novel proteinaceous ingredient is a relatively simple composition notwithstanding its substantial impact on the art. The proteinaceous ingredient is comprised of soy protein isolate and caseinate in a relative weight ratio of soy:caseinate of from about 10:90 to about 80:20 provided that the amount of caseinate present is at least 0.9% by weight of the overall dry solids in the whitener formulation. The amount of the proteinaceous ingredient will range from about 2 to about 10% by weight based on the dry weight of the coffee whitener formulation. The product of this invention allows soy protein isolates to replace even significant amounts of casein in conventional coffee whitener formulations without incurring the previously mentioned side effects which are conventionally attributed to the soy protein isolate.

DESCRIPTION OF THE PREFERRED EMBODIMENTS

Referring particularly to the composition of the present invention, the proteinaceous ingredient of the coffee whitener formulation preferrably comprises predominantly as essential components a soy protein isolate and caseinate.

The soy protein isolate is most commonly derived from ground defatted soy bean material through an aqueous extraction. The protein solution is then centrifuged to remove the insoluble material and the pH of the solution is adjusted to the isoelectric point of the protein with an acidic reagent. Precipitation of the protein takes place and the resultant precipitant is washed and dried to provide an isolate having a protein content on a moisture free basis of between 80 and 95%. The present invention is not intended to be limited by the specific type of soy protein isolate that can be employed and any type which is normally available can be used in the whitening formulation of the instant invention. Typical processes for production of soy isolates which may be employed in the formulation of the instant invention include those described in U.S. Pat. Nos. 2,881,159 and 3,001,875. Preferred soy isolates for use in the invention comprise those described in U.S Pat. Nos. 3,642,490 and 3,694,221, herein incorporated by references in the instant disclosure.

The casein of the present invention is derived from milk and is subjected to alkali neutralization by means of any of the well known alkaline neutralization reagents, said neutralization occurring either prior to admixture with the soy protein isolates or afterwards. For this reason the terms casein (unneutralized) and caseinate are used interchangeably in the context of this invention. Please note that mixtures of pure casein and soy protein isolates are within the contemplation of this invention because the step of neutralization merely effects the desired pH of the final beverage without being a critical embodiment of the novel composition herein disclosed. A preferred embodiment of the present invention utilizes sodium caseinate as the form of casein. Sodium caseinate is conventionally used in coffee whitener formulations to serve a specific function while simultaneously serving as a nutrient additive. Generally, sodium caseinate which is water soluble exhibits suitable functionality and resistance to feathering in hot coffee if at least about 2% is used in the coffee whitener formulation. However, as previously discussed, prior to the present invention it was not believed that the soy protein isolates without special modifications (U.S. Pat. No. 3,764,711) could replace any fraction of the caseinate, nor was it believed that the presence of a particular minimum amount of the caseinate would effect the functionality of the soy.

The overall amount of proteinaceous ingredient of the present invention will range from about 2 to about 10% and preferrably 3 to about 10% by dry weight of the coffee whitener formulations. Amounts outside this range will detract from the desired functionality of this invention. The relative proportions of the constituents of the proteinaceous ingredient will exhibit functionality for coffee whitener formulations, ranging from only an appreciable amount of soy to a substantial amount of soy. The relative proportion of soy protein isolate to casein may vary from about 10:90 to about 80:20 by weight.

However, it is critical that casein be present in an amount of at least 0.9% by weight of the whitener formulation in order that an acceptable resistance to feathering can be exhibited. The reason that this critical amount of casein is necessary is not precisely understood, particularly since no chemical interaction has at present been observed to have taken place. However, the results show quite conclusively that below this amount, the resistance of the formulation against feathering is unsuitable. This critical limitation is still further surprising because 0.9% caseinate alone is functionally unsuitable in coffee whitener formulations. A minimum amount of caseinate of 1.5% is preferred. A minimum amount of caseinate of about 1.5 to about 3.0% is especially preferred because of superior functionality throughout the range of relative proportions of soy protein isolate to caseinate. Although vegetable or animal proteinaceous material in addition to soy and casein may be present in the proteinaceous ingredient, they are in no way critical to the present invention. A relative ratio of soy protein isolate to caseinate of from 40:60 to 60:40 is preferred for purposes of minimizing cost and maximizing functionality. A ratio of soy:casein of 50:50 is especially preferred because it represents an optimum between desired functionality and quantity of soy throughout the range of overall amount of proteinaceous ingredient, i.e., 2 to 10%.

As a particularly preferred embodiment of the present invention, where the proteinaceous ingredient is comprised substantially of soy protein isolate, i.e., greater than 50% of the protein (not overall formulation) by weight, the feathering which is particularly characteristic of soy cannot only be substantially suppressed but can even be eliminated. This is accomplished by correlating the relative amount of soy protein isolate to caseinate with the overall concentration of the proteinaceous ingredient in the whitener formulation.

That is, for ratios of soy to casein of from about 50:50 and 60:40 if the overall amount of protein is 4% or greater, and for ratios of between about 60:40 and 70:30 if the overall amount of protein is 6% or greater the coffee whitener formulations of the present invention surprisingly exhibit no feathering.

Aside from the unique proteinaceous ingredient of the present invention, the other constituents of the whitener formulation are conventional. Neither special chemical modifiers for the protein nor extraneous processing pretreatments are necessary. A typical but non-limiting formulation by weight (on dry basis) for coffee whiteners of this invention comprises:

Water soluble sugar — 35–65%
Edible fat — 20–50%
Proteinaceous ingredient — 2–10%
Stabilizing salt — 0.5–5.0%
Conventional emulsifier — 0.5–3%

The water soluble sugar can be any convenient carbohydrate such as for example sucrose, lactose or corn syrup solids. The stabilizing salt is added as a buffering agent to counteract the acidity of the coffee and assist the colloidal dispersibility of the protein. Typical materials include sodium and potassium salts of either citric acid or ortho, meta or polyphosphoric acids or mixtures thereof with preferred materials comprising sodium polyphosphate, dipotassium phosphate, disodium phosphate and the like. The emulsifier can be of any suitable type such as used in conventional fluid fat emulsion products, such as, for example, mono- and diglycerides, diacetyl tartaric acid esters of mono- and diglycerides, polyglycerol esters of fatty acids or combinations thereof. If desired, nutritive additives such as carotene, riboflavin, etc., anti-caking agents, and flavoring may be included in the formulation.

Any suitable edible fat or oil, either animal or vegetable, or combinations of such edible fats or oils, may be used and the particular type of fat employed is not deemed to be critical to the practice of the present invention. Typical types of fats which may be employed include corn oil, coconut oil, cottonseed oil or soybean oil, including hydrogenated fats and oils.

In preparing the coffee whitener formulation and particularly the proteinaceous ingredient it is generally preferred to intimately dry blend or wet blend a mixture of dried soy protein isolate and dried, neutralized caseinate. Alternatively, the soy protein isolate and casein or caseinate may be slurried in an aqueous medium and dried simultaneously prior to the addition of the other whitener formulation ingredients. A further alternative is that the casein may be blended with the soy protein isolate prior to neutralization of the casein. Then, if dried caseinate and dried soy isolate are utilized the proteinaceous ingredient and stabilizing salt are dispersed in water by warm mixing at about 120° F. If the casein and soy isolate are wet blended the slurry is merely warmed and the salt stabilizer is added. The fat, along with the conventional emulsifier is melted in a separate step. The premelted fat is mixed into the protein dispersion and the water soluble sugar or carbohydrate is mixed in, until the sugar or carbohydrate solids dissolve. The temperature of the mixture is brought to 170° F and the mixture is pasteurized and homogenized at pressures of from about 0 to 3500 psi. The homogenization is required to produce a desired size of the fat globules for purposes of emulsion stability and whitening power. Such atomization is sufficient in all cases merely as a result of the atomization at the nozzle of, for example, driers which conventionally use high pressure feed pumps. However, additional pressures up to 3500 psi will provide additional whitening power if desired provided that the pressure is not excessive. It is possible to obtain so high a pressure that the emulsion is broken causing the formulation to feather as well as suffer reduction in whitening power. Whitening power is a term well known in the art to describe the relative degree of whiteness in color that various formulations exhibit when added to coffee. Note that fat and protein dispersion are mixed and 57 parts of corn syrup solids having a dextrose equivalent of 24 is admixed until dissolved. The formulation is pasteurized at 160° F for 15 minutes. The mixture is then spray dried to a moisture content of 2.5%. The following table illustrates the results of the trials:

Table I

| Trial | Soy Protein Isolate (%) | Sodium Caseinate (%) | (No Soy) Total Caseinate Plus Soy (%) | Ratio Soy/Caseinate | Feathering |
| --- | --- | --- | --- | --- | --- |
| 1 | 0 | 0.9 | 0.9 | 0/100 | Heavy |
| 2 | 0 | 2 | 2 | 0/100 | Light |

Table II

| Trial | Soy Protein Isolate (%) | Sodium Caseinate (%) | (No Caseinate) Total Caseinate Plus Soy (%) | Ratio Soy/Caseinate | Feathering |
| --- | --- | --- | --- | --- | --- |
| 1 | 2 | 0 | 2 | 100/0 | Heavy |
| 2 | 4 | 0 | 4 | 100/0 | Heavy |
| 3 | 6 | 0 | 6 | 100/0 | Heavy |

Table III

| Soy & Caseinate Total (%) | Soy:Caseinate Ratio | | | | |
| --- | --- | --- | --- | --- | --- |
| | Less than 50/50 | 50/50 | 60/40 | 70/30 | 80/20 |
| 2 | 1 | 1 | x | x | x |
| 3 | 0 | 0 | 1 | 1 | x |
| 4 | 0 | 0 | 0 | 1 | x |
| 5 | 0 | 0 | 0 | 1 | 1 |
| 6 | 0 | 0 | 0 | 0 | 1 |
| 7 | 0 | 0 | 0 | 0 | 1 |
| 8 | 0 | 0 | 0 | 0 | 1 |
| 9 | 0 | 0 | 0 | 0 | 1 |
| 10 | 0 | 0 | 0 | 0 | 1 |

(x indicates no functionality and heavy feathering, 1 indicates acceptable feathering, 0 indicates no feathering)

for purposes of the present invention homogenization is not critical. Finally, the mixture is dried by spray drying or any other conventional means of drying a coffee whitener formulation to less than about 5% moisture. Alternatively, the drying step can be by-passed if, for example, a liquid whitener is desired. Also, by freezing the formulation it may be used as a frozen coffee whitener formulation.

In order to illustrate the invention even more fully, the following specific examples are set forth. These examples are presented for illustrative purposes only and are not intended to limit the scope of the invention in any manner. Unless otherwise indicated, all parts and percentages are by dry weight.

EXAMPLE I

A series of trials having various proportions and quantities of proteinaceous ingredients (See Tables I, II and III) were conducted. In each trial the soy protein isolate commercially available as Supro 710, a trademark of Ralston Purina Company, and sodium caseinate are dry blended to comprise the proteinaceous ingredient. No other isolated protein is contained in the proteinaceous material. The proteinaceous ingredient along with 2 parts of $K_2HPO_4$ are mixed with 21 lbs. of water at 120° F. Then 36 parts of fat sold by Glidden-Durkes under its trademark Paramount C are melted together with 0.9 parts of mono- and diglycerides sold under the name ATMOS 150 (having approximately 52% alpha-mono glyceride), a trademark of ICI. The As is evidence from the foregoing tables 0.9 caseinate alone is nonfunctional (Table I). Soy protein alone is non-functional; in fact, it was observed that feathering increased as the amount of soy increased in these situations. In table three the amount of casein may be calculated by multiplying the ratio times the total % of soy and caseinate. Clearly, below 0.9% caseinate resulted in heavy feathering and non-functionality, 50/50 ratio and lower from 3–10% resulted in no feathering and minimum casein level of 1.5 – 2.5 will insure excellent results provided the ratio is less than 80/20.

What is claimed is:

1. A coffee whitener composition consisting essentially of sugar, fat, stabilizing salt, an emulsifier and a proteinaceous ingredient; said proteinaceous ingredient being present in an amount of from about 2 to about 10% by weight based on the dry weight of the whitener composition, said proteinaceous ingredient consisting essentially of soy protein isolate and caseinate in a weight ratio of soy protein isolate:caseinate of from about 10:90 to about 80:20, provided that at least about 0.9% by dry weight of the whitener composition is casein.

2. The composition of claim 1 wherein the amount of proteinaceous ingredient is from about 3 to about 10%.

3. The composition of claim 1 wherein the ratio of soy protein isolate:caseinate is from 40:60 – 60:40.

4. The composition of claim 2 wherein the ratio of soy protein isolate:caseinate is 50:50.

5. The composition of claim 1 wherein the amount of proteinaceous ingredient is at least about 4–6% and the ratio of soy protein isolate:caseinate is from 50:50 to 70:30.

6. The composition of claim 1 wherein the amount of caseinate is at least 1.5 to about 3.0% provided that the ratio of soy protein isolate:caseinate is less than 80:20.

7. The composition of claim 1 wherein the amount of casein is at least 1.5%.

8. A non-feathering coffee whitener composition consisting essentially of sugar, fat, stabilizing salt, an emulsifier and a proteinaceous ingredient said proteinaceous ingredient being in an amount of from about 3 to 10% by weight based on the dry weight of the whitener composition, said proteinaceous ingredient consisting of soy protein isolate and caseinate in a weight ratio of soy protein isolate:caseinate of from 10:90 to 50:50.

9. A non-feathering coffee whitener composition consisting essentially of sugar, fat, stabilizing salt, an emulsifier and a proteinaceous ingredient; said proteinaceous ingredient being in an amount of from about 4 to 10% by weight based on the dry weight of the whitener composition, said proteinaceous ingredient consisting of soy protein isolate and caseinate in a weight ratio of soy protein isolate:caseinate of from 10:90 to 60:40.

10. A non-feathering coffee whitener composition consisting essentially of sugar, fat, stabilizing salt, an emulsifier and a proteinaceous ingredient; said proteinaceous ingredient being in an amount of from about 6 to 10% by weight based on the dry weight of the whitener composition, said proteinaceous ingredient consisting of soy protein isolate and caseinate in a weight ratio of soy protein isolate:caseinate of from 10:90 to 70:30.

* * * * *